United States Patent
Augenstein et al.

(10) Patent No.: US 7,896,065 B2
(45) Date of Patent: Mar. 1, 2011

(54) CHARGE-AIR COOLER FOR MOTOR VEHICLES

(75) Inventors: Claus Augenstein, Gerlingen (DE); Karsten Emrich, Stuttgart (DE); Martin Engelhardt, Möglingen (DE); Klaus Förster, Stuttgart (DE); Franco Ghiani, Bietigheim-Bissingen (DE); Daniel Hendrix, Stuttgart (DE); Scott Horoho, Mount Pleasant, SC (US); Reinhard Kull, Ludwigsburg (DE); Andre Schairer, Stuttgart (DE); Bernd Weiler, Urbach (DE); Stefan Weise, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 711 days.

(21) Appl. No.: 10/574,217

(22) PCT Filed: Sep. 30, 2004

(86) PCT No.: PCT/EP2004/010919

§ 371 (c)(1),
(2), (4) Date: Mar. 31, 2006

(87) PCT Pub. No.: WO2005/031239

PCT Pub. Date: Apr. 7, 2005

(65) Prior Publication Data

US 2007/0114013 A1    May 24, 2007

(30) Foreign Application Priority Data

Oct. 2, 2003 (DE) ................. 103 46 186

(51) Int. Cl.
*F28F 9/02* (2006.01)

(52) U.S. Cl. ..................... 165/174; 165/175

(58) Field of Classification Search ............... 165/80.2, 165/80.3, 104.21, 104.26, 104.33, 173, 174, 165/175, DIG. 483; 361/700; 29/890.032, 29/890.044
See application file for complete search history.

(56) References Cited

U.S. PATENT DOCUMENTS

| 1,915,805 | A | * | 6/1933 | Sutcliffe | 165/137 |
|---|---|---|---|---|---|
| 2,793,510 | A | * | 5/1957 | Komroff et al. | 62/280 |
| 3,195,624 | A | * | 7/1965 | Richards et al. | 165/158 |
| 4,693,084 | A | * | 9/1987 | Ahrens | 165/174 |
| 5,090,477 | A | | 2/1992 | Sprow et al. | |
| 5,228,512 | A | * | 7/1993 | Bretl et al. | 165/153 |
| 5,485,737 | A | | 1/1996 | Dickerson | |
| 5,737,952 | A | | 4/1998 | Baumann et al. | |
| 5,898,996 | A | * | 5/1999 | Buchanan et al. | 29/890.052 |
| 6,109,344 | A | * | 8/2000 | Higgins | 165/174 |

(Continued)

FOREIGN PATENT DOCUMENTS

DE    195 32 860 A1    3/1997

(Continued)

*Primary Examiner*—Teresa J Walberg
(74) *Attorney, Agent, or Firm*—Foley & Lardner LLP

(57) ABSTRACT

The invention relates to a heat exchanger for motor vehicles, especially for utility vehicles. The heat exchanger can include a heat exchanger unit that includes tubes having tube ends and ribs disposed between the tubes, and collecting tanks disposed on both ends and produced by internal high pressure forming for introducing and discharging a medium. The collecting tanks can include bottoms with openings for receiving the tube ends, covers, and inlet and outlet tubes.

34 Claims, 2 Drawing Sheets

U.S. PATENT DOCUMENTS

Figure 1:
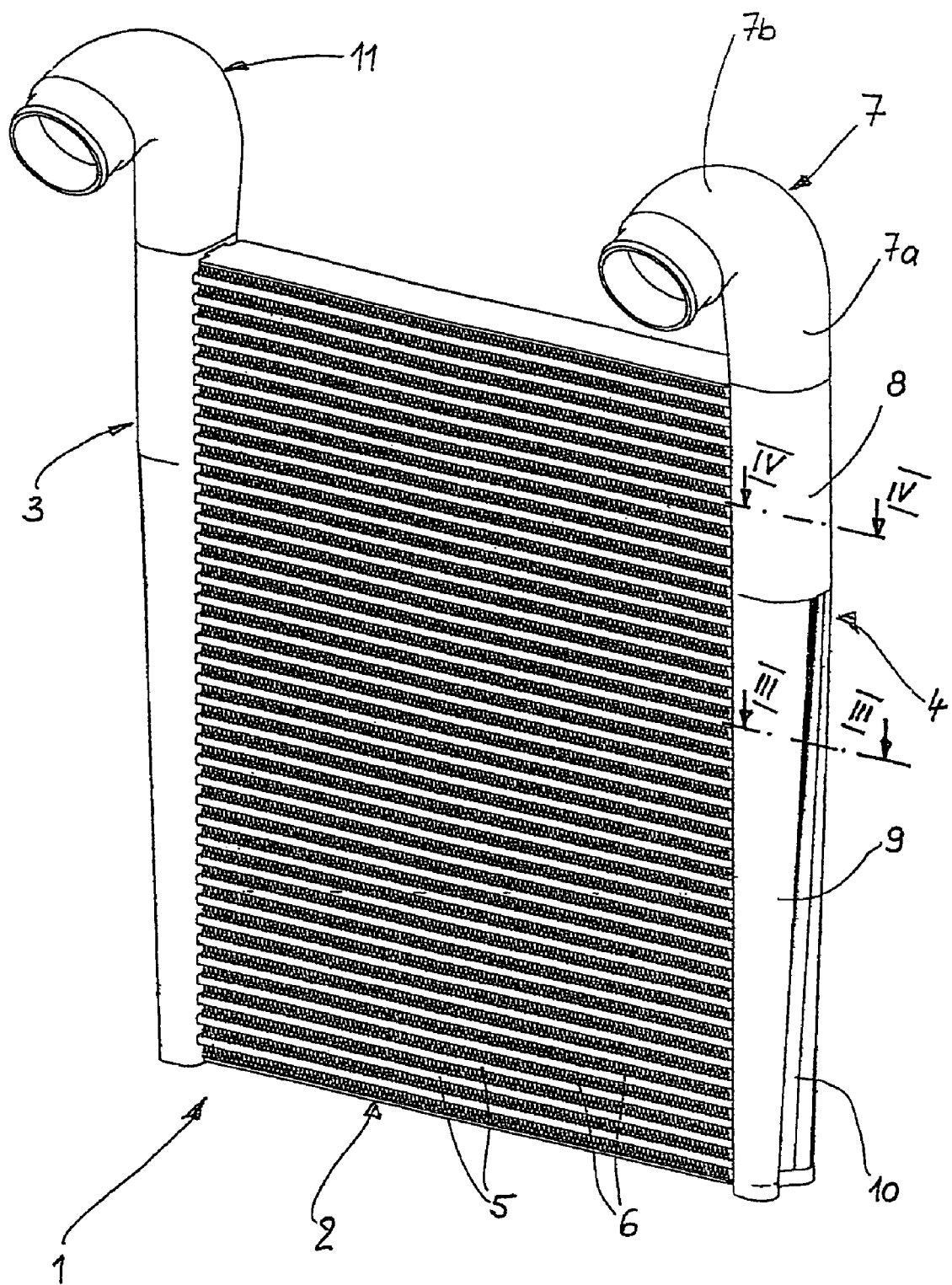

| | | |
|---|---|---|
| 6,212,982 B1 | 4/2001 | Augustin et al. |
| 6,216,509 B1 | 4/2001 | Lotspaih et al. |
| 6,302,196 B1 * | 10/2001 | Haussmann .................. 165/153 |
| 6,374,911 B1 * | 4/2002 | Olson et al. .................. 165/173 |
| 6,581,679 B2 | 6/2003 | Fischer et al. |
| 6,993,838 B1 | 2/2006 | Staffa et al. |
| 2002/0066553 A1 * | 6/2002 | Fischer et al. ............... 165/174 |
| 2003/0221819 A1 * | 12/2003 | Jang ........................... 165/173 |
| 2004/0182547 A1 | 9/2004 | Birkert et al. |

FOREIGN PATENT DOCUMENTS

| | | |
|---|---|---|
| DE | 196 47 964 A1 | 5/1998 |
| DE | 199 07 247 A1 | 8/2000 |
| DE | 199 11 334 A1 | 9/2000 |
| DE | 199 53 785 A1 | 5/2001 |
| DE | 199 53 787 A1 | 5/2001 |
| DE | 199 62 958 C2 | 7/2001 |
| DE | 100 56 074 A1 | 5/2002 |
| DE | 699 02 382 T2 | 1/2003 |
| DE | 102 04 107 A1 | 9/2003 |
| DE | 699 06 093 T2 | 9/2003 |
| EP | 0 900 605 A2 | 3/1999 |
| EP | 1 080 335 B1 | 3/2001 |
| JP | 58-112885 U | 8/1983 |
| JP | 58-154389 U | 10/1983 |
| JP | 62-144830 U | 9/1987 |
| JP | 08-136182 A | 5/1996 |
| JP | 09-004995 A | 1/1997 |
| WO | WO 95/31635 A1 | 11/1995 |
| WO | WO 99/60322 A1 | 11/1999 |
| WO | WO 02/12816 A1 | 2/2002 |

* cited by examiner

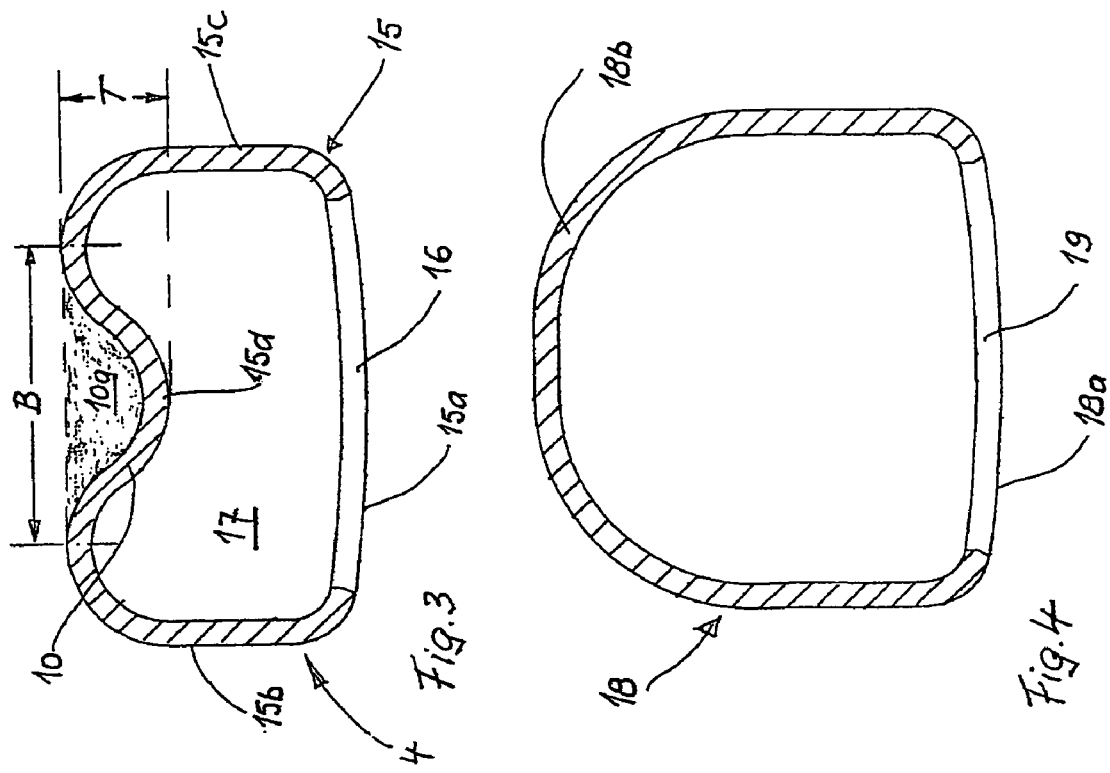
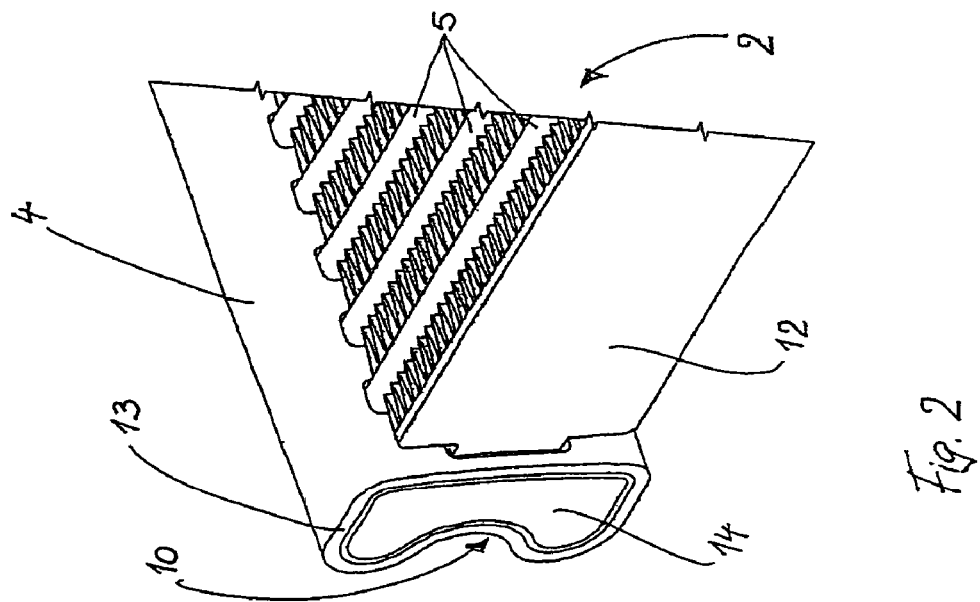

CHARGE-AIR COOLER FOR MOTOR VEHICLES

The invention relates to a heat exchanger for motor vehicles, in particular a charge-air cooler, in particular for utility vehicles.

Heat exchangers, such as, for example, charge-air coolers for motor vehicles nowadays, often have a soldered heat exchanger unit which is constructed from flat tubes, corrugated fins and tube bottoms which receive the tube ends. Header boxes, for example what are referred to as air boxes, are placed onto the tube bottoms and are connected tightly thereto. The header boxes—even in the case of utility vehicles—are frequently produced from plastic and are connected to the tube bottoms mechanically, for example by means of a flared joint with a rubber seal. The header boxes are sometimes also designed as cast aluminum boxes which are welded to the tube bottoms which are likewise produced from an aluminum material. Charge-air coolers with plastic air boxes have been disclosed, for example, by DE-A 199 53 785 and DE-A 199 53 787 of the applicant. At relatively high temperatures, for example above 220° Celsius of the charge air, as can be expected in the case of future developments, plastic air boxes no longer withstand the pressure and temperature stresses—in this case, air boxes made from a metallic material, for example cast aluminum, are used. These cast air boxes are produced in a permanent mold casting process which provides diverse creative possibilities but is very complicated and cost-intensive.

It is an object of the present invention to improve a heat exchanger of the type mentioned at the beginning to the effect that the header boxes withstand relatively high temperatures and pressures without the production costs substantially rising.

According to the invention, it is provided that at least part of at least one header box is produced from a semifinished product by means of internal high-pressure forming (IHF). The use of a metallic semifinished product enables the stresses occurring due to temperature and pressure to be controlled. In addition, the costly permanent mold casting process is avoided and, instead, a cost-effective semifinished product is used which is deformed by the cost-effective IHF process.

The internal high-pressure forming, which is referred to as the IHF process, is known per se, for example from DE-A 102 04 107 for a metallic housing of an exhaust gas heat exchanger, into which an expansion bead is molded by means of IHF. In the IHF process, also called hydroforming, closed housing parts are "inflated" by means of a liquid pressure medium (water). The parts to be deformed are placed into molds of corresponding contour and are then acted upon from the inside by means of a pressurized liquid in such a manner that the material of the housing is placed against the contour of the die.

According to an advantageous refinement of the invention, only the cover is deformed from a semifinished product in the IHF process and is welded to a conventional tube bottom. This measure already brings a reduction in the production costs, in particular if, advantageously, a rolled aluminum sheet is used as the semifinished product for the cover.

In a further advantageous refinement of the invention, both the cover and the tube bottom can be produced from a semifinished product by the IHF process. The integration of the tube bottom brings a further reduction in cost, since bottom and cover are produced from the same semifinished product, advantageously an extruded aluminum tube. The shaping of the entire header box composed of bottom and cover may take place by means of the IHF process with which a multiplicity of possibilities with regard to the shaping are produced.

According to a further advantageous refinement of the invention, the entire header box, comprising bottom, cover and connecting pipe, is produced as a single piece from a semifinished product by means of the IHF process. This advantageously takes place using an extruded semifinished aluminum tube which is first of all prebent in order to form a connecting pipe for the header box, so that the connecting pipe obtains its direction in relation to the rest of the air box. After that, a longitudinal bead is placed into the for example round semifinished product by pressing from the outside, i.e. over part of the length of the header box, thus resulting in a header box cross section which tapers from the connecting pipe toward the opposite end side. This shaping assists the flow of a medium in the header box. In addition, this flattening of the header box affords the advantage of improved installation conditions in a motor vehicle. The final shape is produced by IHF by the semifinished product material being pressed from the inside against the contour of the die by the high pressure. The advantages of this header box produced according to the invention are high temperature and internal pressure strength owing to the semifinished product material used and the closed cross section, and also low production costs on account of the cost-effective IHF process.

The connecting pipe is advantageously designed as an end-side extension of the header box. In a variant, instead of the end-side connecting pipe or in addition to the end-side connecting pipe, a connecting pipe is arranged laterally on the header boxy, in particular is welded or soldered to the header box.

According to an advantageous refinement of the invention, the end surface which lies opposite the connecting pipe is closed by a cover which can be soldered into place. A tight and pressure-resistant connection and a closure of the header box are therefore achieved.

According to a further advantageous refinement, the connecting pipe is designed as an extension of the header box and/or covers an end surface of the header box by the connecting pipe.

According to a further advantageous refinement of the invention, the openings, which are referred to as rims, in the bottom of the header box are produced by punching, to be precise in particular by punching counter to hydraulic internal high pressure, as is known from DE-A 195 32 860 of the applicant. This process affords the advantage of "technology pure" manufacturing, since a hydraulic internal high pressure is built up both for the shaping of the header box and for the production of the rims, with the same devices being useable. This reduces the manufacturing costs and, furthermore, has the advantage, under some circumstances, of forming without cutting.

According to an advantageous variant, the openings are optionally prepunched in the bottom and are produced by drawing through, with the drawing through particularly preferably taking place counter to a hydraulic internal high pressure. This also reduces the manufacturing costs and, furthermore, has under some circumstances the advantage of forming without cutting.

The header box is preferably designed with a wall thickness which is, in particular, continuously, between 2 mm and 5 mm, particularly preferably between 3 mm and 4 mm. In particular the stability of the heat exchanger to pressure is increased by this means without the manufacturing outlay rising unacceptably.

According to advantageous embodiments, the bottom has a curvature and/or the header box has a stepless and/or kink-free cross section, in particular continuously. By this means, under some circumstances, the header box is less deformed in the event of pressurization and its stability to pressure is increased. In this case, a radius of the curvature of the bottom is particularly advantageously and particularly continuously between 100 mm and 400 mm, preferably between 200 mm and 300 mm. In the transition region to the cover, a radius of curvature of the bottom, here viewed in cross section, is preferably between 5 mm and 20 mm, particularly preferably between 10 mm and 15 mm. When one or more parameters within the ranges mentioned are kept to, a heat exchanger according to the invention has, under some circumstances, a particularly high stability to pressure.

An exemplary embodiment of the invention is illustrated in the drawing and is described in more detail below. In the drawing FIG. 1 shows a charge-air cooler according to the invention, FIG. 2 shows a corner detail of the charge-air cooler according to the invention shown in FIG. 1, FIG. 3 shows a first cross section through an air box of the charge-air cooler according to FIGS. 1 and 2, and FIG. 4 shows a second cross section through the air box.

FIG. 1 shows a charge-air cooler 1 according to the invention with a heat exchanger unit 2 and air boxes 3, 4 arranged on both sides. The heat exchanger unit 2 is composed of flat tubes 5 and corrugated fins which are arranged between the latter and over which ambient air flows. The tubes 5 lead into the air boxes 3, 4 and are soldered thereto and to the corrugated fins 6. All of the parts, tubes 5, corrugated fins 6 and air boxes 3, 4 are composed of aluminum alloys. Each of the two air boxes 3, 4 is of single-piece design and is composed of three sections (explained with regard to the air box 4), namely a connecting pipe 7, a cylindrical part 8 (not circular-cylindrical) and a conical or flattened part 9 which has a longitudinal bead 10 running in the longitudinal direction of the air box 4. The connecting pipe 7 has a rectilinear part 7a which adjoins the rectilinear air box part 8 in alignment therewith and has an elbow 7b bent approximately through 90° to 120°. The air box 3 is designed in mirror-inverted manner with respect to the air box 4 and has a charge-air inlet connecting pipe 11. The charge air which has been compressed by a compressor (not illustrated) of a motor vehicle and has an increased temperature enters the inlet connecting pipe 11, is distributed via the air box 3, flows through the heat exchanger unit 2 and the tubes 5 thereof in one direction and passes into the opposite air box 4 from which the charge air emerges through the outlet connecting pipe 7. Since the charge-air cooler 1 in this case is of symmetrical construction, a reverse direction of flow, i.e. entry into the connecting pipe 7 and exit through the connecting pipe 11 is likewise possible. As known from the prior art cited at the beginning, the charge-air cooler 1 is arranged in the front engine compartment of the motor vehicle, frequently as part of a cooling module.

FIG. 2 shows a corner region of the charge-air cooler 1 according to FIG. 1 with the air box 4 into which the tubes 5 lead. The heat exchanger unit 2 is closed laterally by means of a side part 12. The air box 4 has an end surface 13 which is closed by a cover 14 soldered into it. The profile of the longitudinal bead 10 can be seen clearly in the end surface 13.

FIG. 3 shows a section through the air box 4 approximately in the region of the section line III-III in FIG. 1 and in the region of a tube 5, with the tube 5 being omitted. The air box 4 has a closed, single-piece cross section 15, since it is produced from a closed tube, an extruded semifinished aluminum tube. The cross section 15 is characterized by a slightly outwardly curved bottom region 15a, two wall regions 15b, 15c running approximately perpendicularly thereto and a bead region 15d which lies opposite the bottom region 15a and is impressed by the bead 10. The wall regions 15b, 15c and the adjoining bead region 15d form the "cover" of the air box 4, and the bottom region 15a forms the "bottom". Bottom and cover are therefore integrated and together form the air box 4. An elongate opening 16 which corresponds in its cross section to the cross section of the tubes 5 or the tube ends thereof, which are soldered into these openings, is arranged within the slightly curved bottom 15a. The cross section 15 has a cross-sectional area 17.

FIG. 4 shows a further section through the air box 4 in the region of the cylindrical section 8 along the line IV-IV in FIG. 1. The air box 4 has in the region 8 a closed cross section 18 which is characterized by a slightly curved bottom 18a and a partially curved, partially rectilinearly extending cover region 18b. An elongate opening 19 (rim) for receiving a tube (not illustrated) is arranged in the bottom 18a. The integration of cover and bottom can also be seen from this cross section 18. It is also possible to design the air box 4 over its entire length with the cross section 18, i.e. a constant cross section, if, for installation reasons, the flattened part 9 (cf. FIG. 1) may be omitted.

The production of the air box 4 and of the air box 3 takes place according to the following process: the starting material is a semifinished aluminum tube which is matched with regard to its wall thickness to the pressure and temperature loading of the charge-air cooler. The extruded semifinished tube, which has a circular cross section, is first of all cut to size (cut to length), then the connecting pipe (7, 11) is prebent, i.e. it obtains its bending radius and its direction in this process step. The tube is then placed into a device and, by means of pressure from the outside by means of a wedge-shaped die (not illustrated), obtains a preparatory shape of the final longitudinal bead 10. The tube is subsequently placed into a mold for the internal high-pressure forming and is acted upon by internal high pressure, so that the tube wall of the tube is placed against the inner contour of the mold. The final shape of the air box (4, 3) is thereby achieved. As illustrated in FIG. 1, the longitudinal bead 10 only extends over part of the length of the air box 4, but may also extend over the entire part or a smaller part of the overall length. As can also be seen from FIG. 1, the bead 10 is of conical design, i.e. it increases with regard to its depth and its width in the direction of that end of the air box 4 which faces away from the connecting pipe 7. The cross section of the longitudinal bead 10 can be seen from FIG. 3; it is characterized by a width B, a depth T and a cross-sectional area 10a (shaded gray). The cross-sectional area 10a increases in a direction starting from the connecting pipe 7, i.e. the cross-sectional area 17 of the air box 4 becomes smaller with increasing distance from the inlet or outlet connecting pipe, by contrast the circumference of the air box 4 remains essentially constant or increases at maximum by a range of 10% to 15%. This cross-sectional reduction fits in well with the flow conditions in the air boxes, since the volumetric flow of charge air increases in the direction of the connecting pipes on account of the tube distribution. However, the beveling of the air box 4 in the region of the section 9 also takes place for installation reasons in order to obtain space in this region.

The openings 16 (cf. FIG. 3) in the bottom 15 of the air box 4 may preferably be produced by punching, with, instead of a die-plate, a hydraulic internal high pressure being built up in the interior of the cross section. This process for producing rims in tubes is disclosed by DE-A 195 32 860 of the applicant. It affords the advantage of production without cutting.

In addition, the same devices as for the internal high-pressure forming of the air boxes 3, 4 can be used.

The invention claimed is:

1. A charge-air cooler for motor vehicles comprising:
   a heat exchanger unit that includes tubes having tube ends and fins arranged between the tubes, and
   a first header box arranged on one side of the tubes, wherein the first header box is configured to introduce a medium into the charge-air cooler, and a second header box arranged on another side of the tube, wherein the second head box is configured to discharge the medium from the charge-air cooler, wherein each header box has a bottom with openings for receiving the tube ends, a cover and an inlet or outlet connecting pipe,
   wherein the header boxes are at least partially produced by internal high-pressure forming (IHF) of a metallic semifinished product,
   wherein each header box includes a longitudinal bead that extends along at least a long axis of the at least one header box,
   wherein the longitudinal bead of the first header box is configured such that a cross section of the first header box decreases as a distance from the inlet connecting pipe of the first header box increases,
   wherein the longitudinal bead of the second header box is configured such that a cross section of the second header box increases as a distance to the outlet connecting pipe of the second header box decreases.

2. The charge-air cooler as claimed in claim 1, wherein only the cover is produced by IHF and is welded to the bottom.

3. The charge-air cooler as claimed in claim 2, wherein the semifinished product is a rolled aluminum sheet.

4. The charge-air cooler as claimed in claim 1, wherein only the cover and the bottom are produced as a single piece from a semifinished product by IHF and are connected to the connecting pipe with a cohesive material joint, in particular are welded or soldered thereto.

5. The charge-air cooler as claimed in claim 4, wherein the semifinished product is an extruded aluminum tube.

6. The charge-air cooler as claimed in claim 4, wherein the openings in the bottom are produced by punching.

7. The charge-air cooler as claimed in claim 6, wherein the openings in the bottom are produced by punching counter to a hydraulic internal high pressure.

8. The charge-air cooler as claimed in claim 4, wherein the openings in the bottom are produced by prepunching before the IHF and/or by drawing through.

9. The charge-air cooler as claimed in claim 4, wherein the cohesive material joint is a welded or soldered joint.

10. The charge-air cooler as claimed in claim 1, the bottom, the cover and the connecting pipe are produced as a single piece by IHF.

11. The charge-air cooler as claimed in claim 10, wherein the connecting pipe is prebent before the IHF process.

12. The charge-air cooler as claimed in claim 1, wherein a part of the cover of the header box has a longitudinal bead produced by pressing from the outside and/or IHF from the inside.

13. The charge-air cooler as claimed in claim 1, wherein, after the IHF process, the header box has at least one open end surface which is closed by a cover.

14. The charge-air cooler as claimed in claim 1, wherein the header box has a wall thickness which, at least in some regions, is greater than 2 mm.

15. The charge-air cooler as claimed in claim 14, wherein the header box wall thickness is greater than 3 mm.

16. The charge-air cooler as claimed in claim 1, wherein the header box has a wall thickness which, at least in some regions, is smaller than 5 mm.

17. The charge-air cooler as claimed in claim 16, wherein the header box wall thickness is smaller than 4 mm.

18. The charge-air cooler as claimed in claim 1, wherein the bottom has a curvature which, at least in some regions, has a radius of curvature greater than 100 mm.

19. The charge-air cooler as claimed in claim 18, wherein the bottom curvature, at least in some regions, has a radius of curvature greater than 200 mm.

20. The charge-air cooler as claimed in claim 1, wherein the bottom has a curvature which, at least in some regions, has a radius of curvature smaller than 400 mm.

21. The charge-air cooler as claimed in claim 20, wherein the bottom curvature, at least in some regions, has a radius of curvature smaller than 300 mm.

22. The charge-air cooler as claimed in claim 1, wherein the bottom in the transition region to the cover has a curvature which, at least in some regions, has a radius of curvature greater than 5 mm.

23. The charge-air cooler as claimed in claim 22, wherein the bottom curvature in the transition region to the cover, at least in some regions, has a radius of curvature greater than 10 mm.

24. The charge-air cooler as claimed in claim 1, wherein the bottom in the transition region to the cover has a curvature which, at least in some regions, has a radius of curvature smaller than 20 mm.

25. The charge-air cooler as claimed in claim 24, wherein the bottom curvature in the transition region to the cover, at least in some regions, has a radius of curvature smaller than 15 mm.

26. The charge-air cooler as claimed in claim 1, wherein the header box, at least in some regions has a step- and/or kink-free cross section.

27. The charge-air cooler as claimed in claim 1, wherein a connecting pipe is designed as an end-side extension of the header box and is curved.

28. The charge-air cooler as claimed in claim 1, wherein the connecting pipe is arranged laterally on the header box.

29. The charge-air cooler as claimed in claim 1, wherein the longitudinal bead of each header box forms a depression in a surface of each header box.

30. The charge-air cooler as claimed in claim 1, wherein the longitudinal bead has a conical or flattened design.

31. A heat exchanger for motor vehicles, comprising:
   a heat exchanger unit, that includes tubes having tube ends and fins arranged between the tubes, and
   a first header box arranged on one side of the tubes, wherein the first head box is configured to introduce a medium into the charge-air cooler, and a second header box arranged on another side of the tube, wherein the second header box is configured to discharge the medium from the charge-air cooler, wherein each header box has a bottom with openings for receiving the tube ends, a cover and an inlet or outlet connecting pipe,
   wherein the header boxes are at least partially produced by internal high-pressure forming (IHF) of a metallic semifinished product,
   wherein a part of the cover of each header box has a longitudinal bead produced by pressing from the outside and/or IHF from inside,
   wherein the longitudinal bead of each header box has a cross section which increases in a direction pointing away from a respective connecting pipe of a respective header box while a cross-sectional area of the respective header box decreases,
wherein the longitudinal bead of the first header box is configured such that a cross section of the first header box decreases as a distance from the inlet connecting pipe of the first header box increases,
wherein the longitudinal bead of the second header box is configured such that a cross section of the second header box increases as a distance to the outlet connecting pipe of the second header box decreases.

32. The heat exchanger as claimed in claim 31, wherein the longitudinal bead extends along at least a long axis of the at least one header box.

33. The heat exchanger as claimed in claim 31, wherein the longitudinal bead forms a depression in a surface of the at least one header box.

34. The heat exchanger as claimed in claim 31, wherein the longitudinal bead has a conical or flattened design.

* * * * *